United States Patent [19]
Kuramatsu

[11] Patent Number: 5,828,704
[45] Date of Patent: Oct. 27, 1998

[54] RADIO SELECTIVE CALLING RECEIVER

[75] Inventor: Hiroyasu Kuramatsu, Shizuoka, Japan

[73] Assignee: NEC Corporation, Tokyo, Japan

[21] Appl. No.: 834,161

[22] Filed: Apr. 14, 1997

[30] Foreign Application Priority Data

Apr. 12, 1996 [JP] Japan .................. 8-091447

[51] Int. Cl.$^6$ .................. H03K 9/00; H04L 7/00; H04B 1/16

[52] U.S. Cl. .................. 375/316; 375/365; 375/354; 455/343

[58] Field of Search .................. 375/316, 365, 375/354, 357, 362, 219; 455/343, 38.3, 260; 370/252, 503, 509, 512

[56] References Cited

U.S. PATENT DOCUMENTS 5,606,742   2/1997   Kido .................. 455/343
5,636,243   6/1997   Tanaka .................. 375/219

Primary Examiner—Stephen Chin
Assistant Examiner—Khai Tran
Attorney, Agent, or Firm—Sughrue, Mion, Zinn, Macpeak & Seas, PLLC

[57] ABSTRACT

In a radio selective calling receiver, a receiving unit extracts a digital signal from a radio signal received through an antenna. A frame synchronization signal detector frame-synchronizes the digital signal output from the receiving unit and outputs a state signal representing a frame synchronization state as one of a pull-in state and a pull-out state. A timer resets a timer value to start a timer operation when the state signal from the synchronization signal detector represents a change from the pull-in state to the pull-out state, and stops the timer operation to output a timer value when the state signal from the synchronization signal detector represents a change from the pull-out state to the pull-in state. A first memory sequentially stores a plurality of timer values from the timer. A second memory stores a reference value calculated on the basis of an average value of the timer values stored in the first memory. A third memory stores in advance data necessary for the radio selective calling receiver. A controller compares a timer value of the timer under operation with the reference value stored in the second memory and resets receiver data using the data stored in the third memory when a comparison result represents a coincidence.

8 Claims, 5 Drawing Sheets

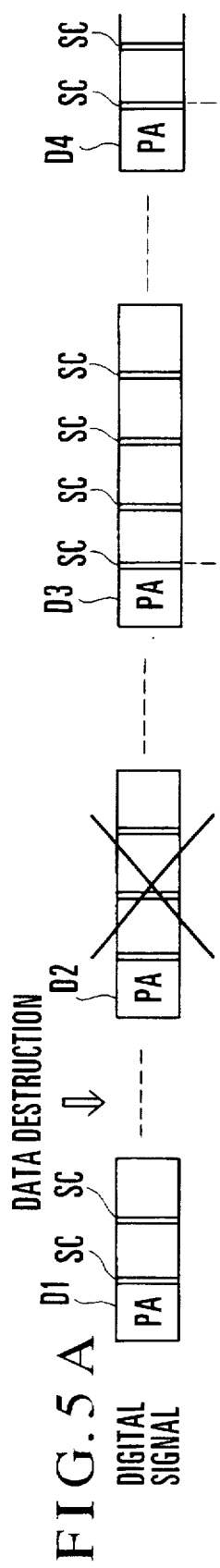
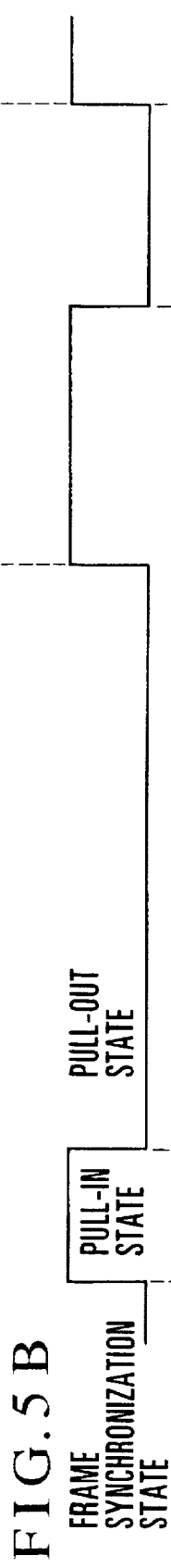
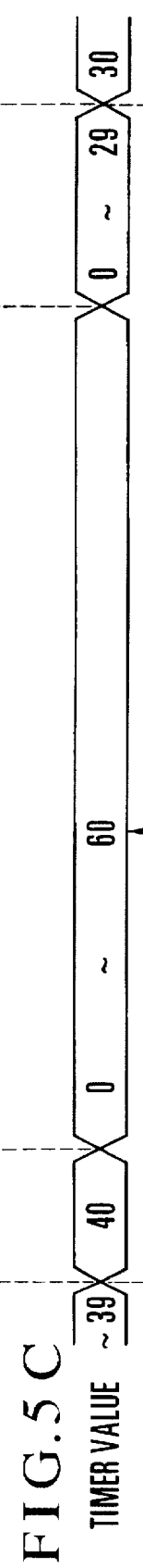
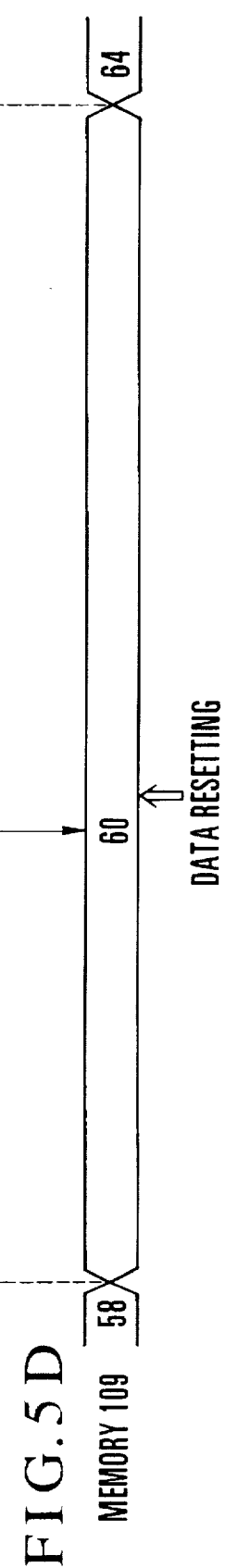
FIG. 5A DIGITAL SIGNAL
FIG. 5B FRAME SYNCHRONIZATION STATE
FIG. 5C TIMER VALUE
FIG. 5D MEMORY 109

RADIO SELECTIVE CALLING RECEIVER

BACKGROUND OF THE INVENTION

The present invention relates to a radio selective calling receiver and, more particularly, to a radio selective calling receiver for refreshing set data when the set data are destroyed.

In a conventional radio selective calling receiver, necessary data are set in this radio selective calling receiver and set in a power ON state only when the power switch is turned on.

The data are set in the conventional radio selective calling receiver only when the power switch is turned on. When the data are destroyed by an external factor such as static electricity in daily life of the user of the radio selective calling receiver, a subsequent calling operation cannot be performed. For this reason, when the user notices the failure of the radio selective calling receiver and turns on the power switch again, the data are reset to restore a normal state.

Even if the user has noticed the absence of calling to the radio selective calling receiver for a long period of time, he cannot determine it as the failure of the receiver itself or the absence of calling from a caller in the normal state of the receiver. For this reason, in the former case, the failure of the receiver itself continues until the power switch is turned on.

To solve the above problem, data may be periodically reset. It is, however, possible to output a selective calling signal during data setting when the data are reset for an asynchronous signal having the POCSAG (British Post Office Code Standardisation Advisory Group) format as one of the selective calling signal formats. In this case, as it is possible to generate noise from a controller, it is difficult to periodically reset the data.

When data is to be reset every time frame synchronization is pulled out, the data must be reset about 720 times/day, provided that a signal is transmitted every minute. The service life of the battery of the radio selective calling receiver is adversely affected.

SUMMARY OF THE INVENTION

It is an object of the present invention to provide a radio selective calling receiver which prevents noise generation during resetting data.

It is another object of the present invention to provide a radio selective calling receiver which suppresses power consumption during resetting data and prevents a reduction in the service life of a battery.

In order to achieve the above objects of the present invention, there is provided a radio selective calling receiver comprising receiving means for extracting a digital signal from a radio signal received through an antenna, frame synchronization signal detecting means for frame-synchronizing the digital signal output from the receiving means and outputting a state signal representing a frame synchronization state as one of a pull-in state and a pull-out state, timer means for resetting a timer value to start a timer operation when the state signal from the synchronization signal detecting means represents a change from the pull-in state to the pull-out state, and stops the timer operation to output a timer value when the state signal from the synchronization signal detecting means represents a change from the pull-out state to the pull-in state, first storage means for sequentially storing a plurality of timer values from the timer means, second storage means for storing a reference value calculated on the basis of an average value of the timer values stored in the first storage means, third storage means for storing in advance data necessary for the radio selective calling receiver, and control means for comparing a timer value of the timer means under operation with the reference value stored in the second storage means and resetting receiver data using the data stored in the third storage means when a comparison result represents a coincidence.

BRIEF DESCRIPTION OF THE DRAWINGS

FIGS. 5A to 5D are timing charts for explaining an operation for resetting data when data destruction has occurred.

DESCRIPTION OF THE PREFERRED EMBODIMENT

The present invention will be described in detail with reference to the accompanying drawings.

Figure 1:
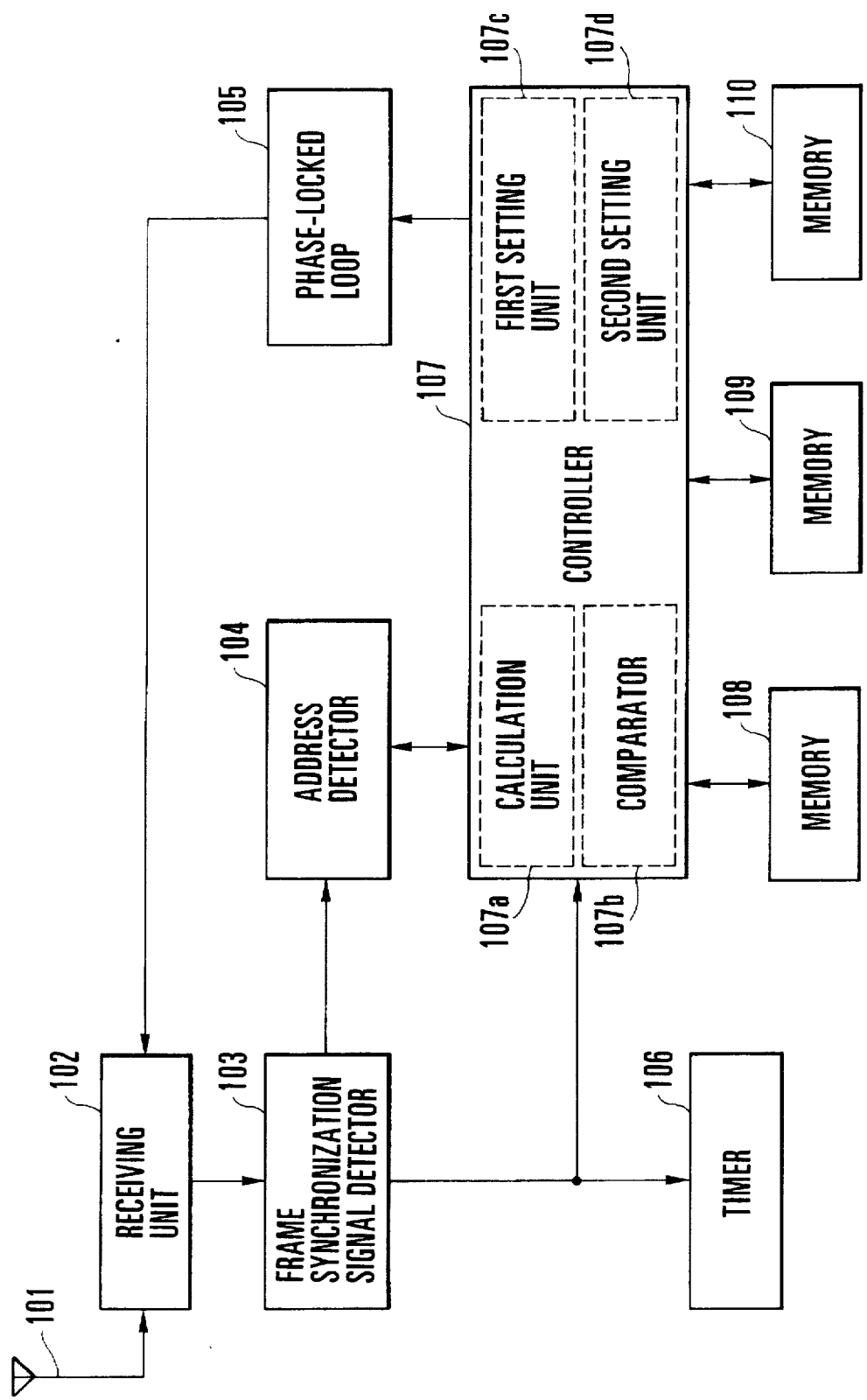
FIG. 1 is a block diagram of a radio selective calling receiver according to an embodiment of the present invention.

Referring to FIG. 1, a radio selective calling receiver according to this embodiment comprises a receiving unit 102, a frame synchronization signal detector 103, an address detector 104, a phase-locked loop 105, and a timer 106. The receiving unit 102 amplifies and demodulates a radio signal received through an antenna 101. The frame synchronization signal detector 103 monitors the state of frame synchronization when frame-synchronizing a digital signal output from the receiving unit 102 and outputs a state signal representing a pull-in or pull-out state of frame synchronization. The address detector 104 detects address information comprised of a selective calling signal from the radio signal received by the receiving unit 102, compares the detected address information with set address information, and outputs a calling detection signal when the detected address information coincides with the set address information. On the basis of set frequency information, the phase-locked loop 105 obtains an output signal phase-locked with the received radio signal. The timer 106 is reset when the frame synchronization state changes from the pull-in state to the pull-out state to start counting and stops the counting operation when the pull-out state changes to the pull-in state and outputs the corresponding timer value (count value).

The radio selective calling receiver also comprises memories 108, 109, and 110, and a controller 107. The memory 108 serves as the first storage unit for storing a plurality of timer values sequentially output from the timer 106. The memory 109 serves as the second storage unit for storing a reference value obtained by multiplying a predetermined coefficient with the average value of the timer values stored in the memory 108. The memory 110 serves as the third storage unit for storing in advance data including address information and frequency information which are required for the self radio selective calling receiver. The controller 107 compares the timer value from the timer 106 under operation with the reference value stored in the memory 109, loading necessary data from the memory 110 when the comparison result represents the coincidence between the timer value and the reference value, and resets receiver data.

The controller 107 comprises a calculation unit 107a, a comparator 107b, a first setting unit 107c, and a second setting unit 107d. The calculation unit 107a calculates the reference value on the basis of the timer values stored in the memory 108 and stores the reference value in the memory 109. The comparator 107b compares the timer value in the timer 106 under operation with the reference value stored in the memory 109. The first setting unit 107c reads out the address information stored in the memory 110 and resets the address information in the address detector 104 when the comparison result of the comparator 107b represents the coincidence between the timer value and the reference value. The second setting unit 107d reads out the frequency information stored in the memory 110 and resets the frequency information in the phase-locked loop 105 when the comparison result of the comparator 107b represents the coincidence between the timer value and the reference value.

The timer 106 monitors the state signal, i.e., the frame synchronization state, output from the frame synchronization signal detector 103, measures a pull-out time, and outputs a timer value from the timer 106. The controller 107 sequentially stores pull-out timer values from the timer 106 in the memory 108 and receives a calling detection signal from the address detector 104.

The memories 108 and 109 constitute a one-chip CPU (Central Processing Unit) together with the controller 107 and stand static electricity from external parts such as the address detector 104. The memory 110 comprises an EEPROM (Electrically Erasable and Programmable Read Only Memory) and is connected to the CPU constituting the controller 107 through a serial bus. The memory 110 cannot be write-accessed by one-shot noise generated by static electricity or the like. Note that the memories 108 and 109 are backed up during the power OFF state of the radio selective calling receiver, so that the storage contents are retained.

Figure 2:
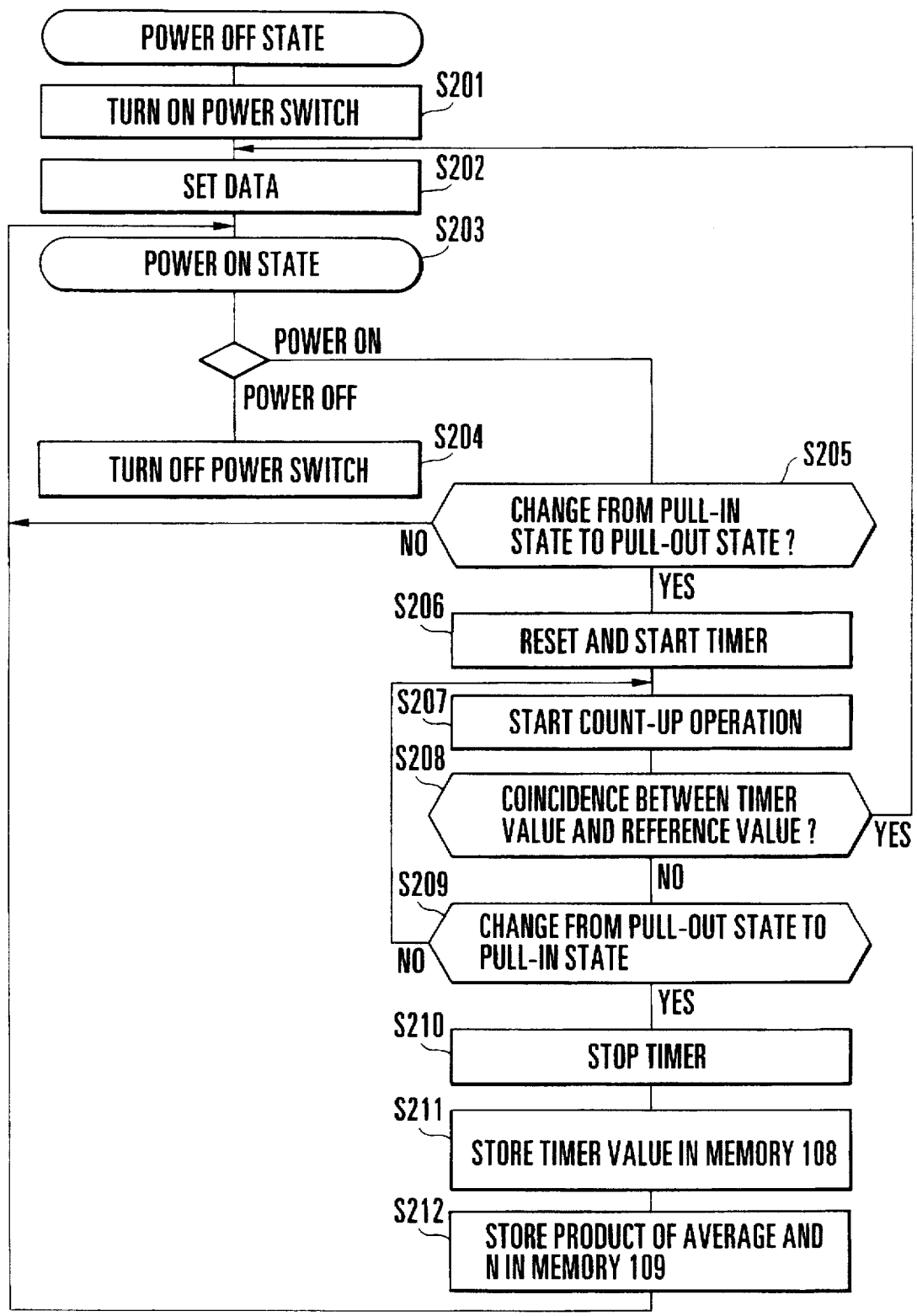
FIG. 2 is a flow chart for explaining the control operation of the radio selective calling receiver shown in FIG. 1.

The operation of the radio selective calling receiver having the above arrangement will be described with reference to FIG. 2.

In the power OFF state, when the user turns on the power switch of the radio selective calling receiver (step S201), the controller 107 sets receiver data (step S202) to change the state to the power ON state (step S203). When the user then turns off the power switch (step S204), the state changes to the power OFF state. The operations from step S201 to step S204 are the same as the procedures in the conventional radio selective calling receiver.

In the power ON state of step S203, it is determined whether the frame synchronization state changes from the pull-in state to the pull-out state (step S205). If YES in step S205, the timer 206 is reset and started (step S206). The timer 206 starts a count-up operation (step S207).

The controller 107 compares the reference value stored in the memory 109 with the timer value in the timer 106 under operation(step S208). If NO in step S208, the controller 107 monitors the frame synchronization state (step S209). If the pull-out state is kept continued in step S209, the flow returns to step S207 to count up the timer value of the timer 106.

If it is determined in step S209 that the frame synchronization state changes from the pull-out state to the pull-in state, the timer 106 stops the counting operation (step S210), and the corresponding timer value is stored in the memory 108 (step S211). Note that if the frame synchronization state is the pull-in state in step S205, the flow advances to step S210.

The controller 107 calculates the average value of the memory values stored in the memory 108, multiplies the average value with a predetermined coefficient N, and stores the product in the memory 109 (step S212).

If the comparison result represents the coincidence between the reference value stored in the memory 108 and the timer value of the timer 106, the flow returns to step S202 to reset the receiver data.

Figure 3:
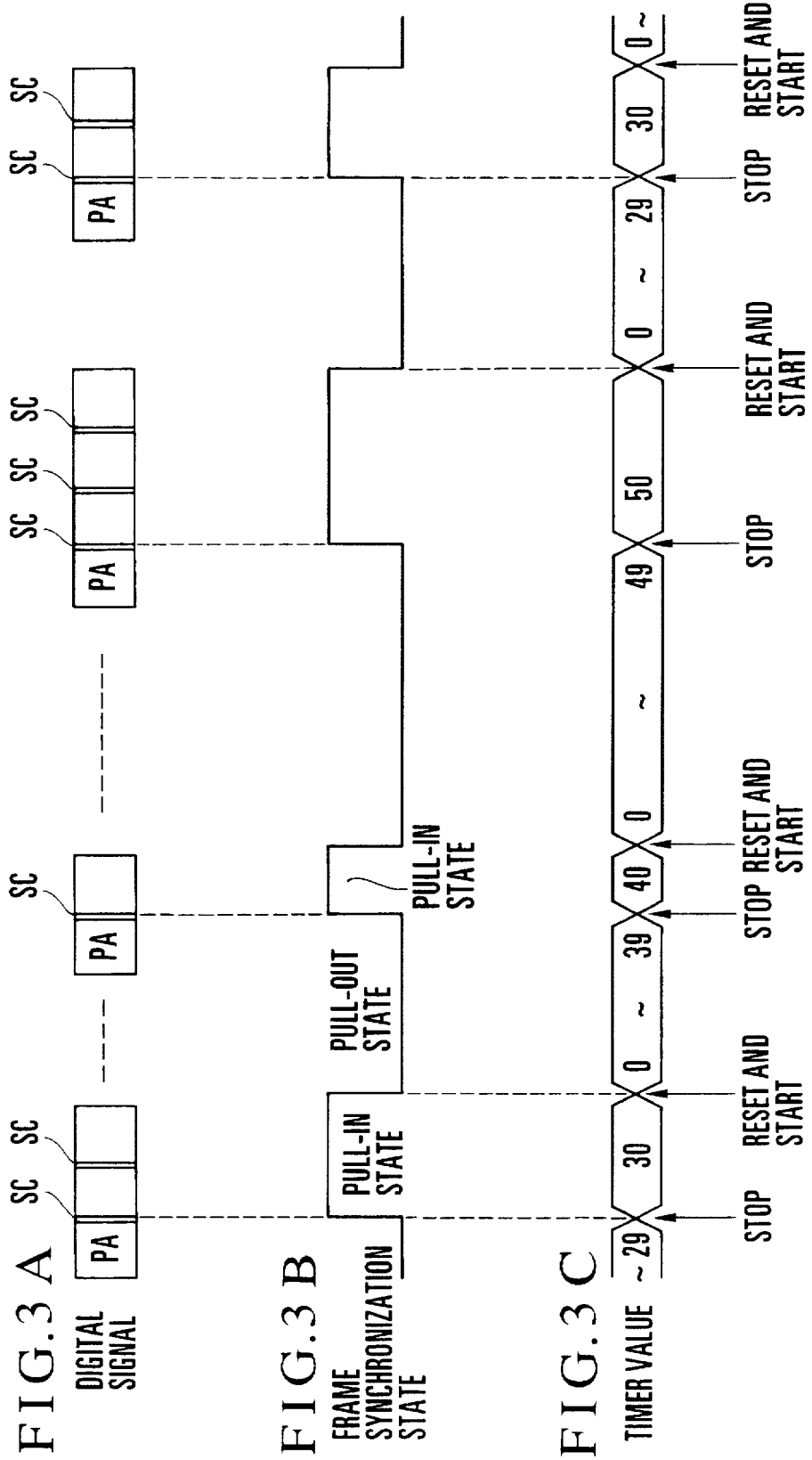
FIGS. 3A to 3C are timing charts showing the relationship between the digital signal, the frame synchronization state, and the timer operation.

FIGS. 3A to 3C show the frame synchronization state and the timer operation. As shown in FIG. 3B, when a frame synchronization signal SC of a digital signal shown in FIG. 3A is received, the frame synchronization state changes from the pull-out state to the pull-in state. When reception of the digital signal is complete, the state changes to the pull-out state. The frame synchronization signal detector 103 detects the pull-in state in FIG. 3B and outputs a pull-in state signal to the timer 106 and the controller 107. Reference symbol PA denotes a preamble signal of the digital signal.

The timer 106 is reset and started, performs a count-up operation, and is stopped, as shown in FIG. 3C, in accordance with the frame synchronization state in FIG. 3B, i.e., the state signal from the frame synchronization signal detector 103. More specifically, the timer 106 is reset and started when the frame synchronization state changes from the pull-in state to the pull-out state. The timer 106 continues the count-up operation in the pull-out state. The timer 106 then stops the count-up operation when the state changes from the pull-out state to the pull-in state.

Figure 4:
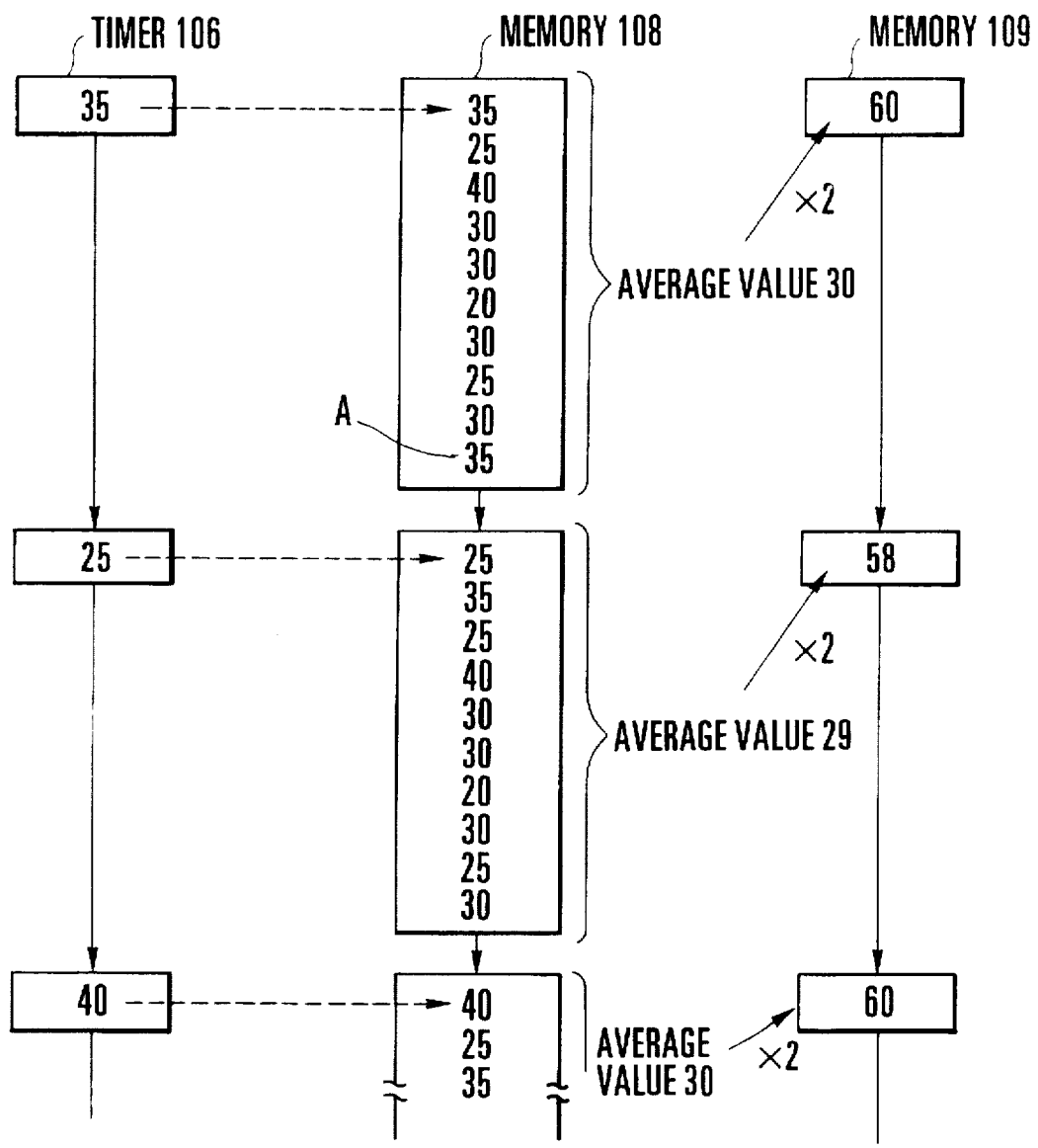
FIG. 4 is a view showing the contents of a timer and memories in FIG. 1.

FIG. 4 shows the contents of the timer 106 and the memories 108 and 109. The memory 108 has a capacity capable of storing 10 timer values from the timer 106. A coefficient to be multiplied with the average value is given as N=2.

Referring to FIG. 4, the controller 107 stores in the memory 108 an output value "35 (sec)" from the timer 106 which has stopped the count-up operations. The memory 108 stores 10 values (35 sec, 25 sec, . . . , 35 sec) including the past values. The average value of the stored values is "30 (sec)" and is multiplied with the coefficient "2", thereby storing the reference value "60 (sec)" in the memory 109.

The controller 107 stores the next output value "25 (sec)" from the timer 106 which has stopped the count-up operation in the same manner as described above. In the memory 108, when a new value is stored, the stored values are shifted one by one, so that the oldest value A of "35 (sec)" is discarded. Ten latest values (25 sec, 25 sec, . . . , 30 sec) are stored in the memory 108. The average value of the stored values is "29 (sec)". Therefore, the old reference value is updated to the reference value "58 (sec)", and this new reference value is stored in the memory 109.

FIGS. 5A to 5E show timings of resetting data when data destruction has occurred. FIGS. 5A to 5E show a state before a digital signal train D1 is received. The reference value "58 (sec)" is stored in the memory 109.

Referring to FIG. 5C, upon reception of the digital signal train D1 in FIG. 5A, the timer value of the timer 106 represents "40 (sec)". This value is stored in the memory 108. As a result, the newly calculated reference value is stored as "60 (sec)" in the memory 109. When reception of the digital signal train D1 is complete, the frame synchronization state changes to the pull-out state, as shown in FIG. 5B. This pull-out state is detected by the frame synchronization signal detector 103. The timer 106 is reset and started in accordance with the state signal, as shown in FIG. 5C.

When data destruction has occurred due to an external factor such as static electricity, a digital signal train D2 cannot be received even if it is sent because the receiver data set in the address detector 104 and the like in the radio selective calling receiver have been destroyed. The frame synchronization signal detector 103 therefore cannot output a detection signal, and the timer 105 continues the count-up operation without being reset. When the timer value of the timer 106 reaches the reference value "60 (sec)" stored in the memory 109, the controller 107 determines that an abnormality has occurred in the set data of the radio selective calling receiver. The controller 107 resets the receiver data in the address detector 104 and the like in accordance with the data stored in the memory 110.

Digital signal trains D3, D4, . . . can be received, and the radio selective calling receiver normally operates.

In the conventional radio selective calling receiver, data is not reset until the power switch is turned on after occurrence of data destruction, as previously described. For this reason, the digital signal trains D2, D3, D4, . . . shown in FIG. 5A cannot be received.

Since the memories 108 and 109 are backed up while the power switch is kept off, immediately after turning on the power switch, the timer values stored before the power switch is turned on are discarded from the oldest timer value, and new timer values measured after the power switch is turned on are sequentially stored in the memory 108. Until all the old timer values stored in the memory 108 before the power switch is turned off are discarded, the average value is calculated on the basis of the old and new timer values and stored in the memory 109. Note that the memory 108 may be subjected to initial resetting when the power switch is turned on, and the average value may be calculated using only new timer values measured after the power switch is turned on.

As has been described above, in the radio selective calling receiver of the present invention, even if data are destroyed due to an external factor such as static electricity in daily life, the data can be automatically reset to restore a normal state. The user can properly respond to a call. The data are reset only when an abnormality has occurred in the radio selective calling receiver itself. The radio selective calling receiver determines the timing of this operation while learning it, thereby greatly improving the efficiency.

What is claimed is:

1. A radio selective calling receiver comprising:

receiving means for extracting a digital signal from a radio signal received through an antenna;

frame synchronization signal detecting means for frame-synchronizing the digital signal output from said receiving means and outputting a state signal representing a frame synchronization state as one of a pull-in state and a pull-out state;

timer means for resetting a timer value to start a timer operation when the state signal from said synchronization signal detecting means represents a change from the pull-in state to the pull-out state, and stops the timer operation to output a timer value when the state signal from said synchronization signal detecting means represents a change from the pull-out state to the pull-in state;

first storage means for sequentially storing a plurality of timer values from said timer means;

second storage means for storing a reference value calculated on the basis of an average value of the timer values stored in said first storage means;

third storage means for storing in advance data necessary for said radio selective calling receiver;

control means for comparing a timer value of said timer means under operation with the reference value stored in said second storage means and resetting receiver data using the data stored in said third storage means when a comparison result represents a coincidence.

2. A receiver according to claim 1, wherein said receiver comprises address detecting means for detecting, on the basis of set address information, address information from the radio signal received through said antenna; and said control means comprises first resetting means for reading out the address information from data stored in said third storage means and resetting the address information in said address detecting means.

3. A receiver according to claim 1, wherein said receiver comprises phase-locked loop means for obtaining, on the basis of set frequency information, an output signal phase-locked with the radio signal received through said antenna; and said control means comprises second resetting means for reading out the frequency information from data stored in said third storage means and resetting the frequency information in said phase-locked loop means when a comparison result represents a coincidence.

4. A receiver according to claim 1, wherein said control means comprises comparing means for comparing a timer value of said timer means under operation with the reference value stored in said second storage means.

5. A receiver according to claim 1, wherein said control means comprises calculating means for calculating the average value of the timer values stored in said first storage means and multiplying the average value with a predetermined constant to obtain the reference value.

6. A receiver according to claim 5, wherein said first storage means stores a predetermined number of latest timer values, and said control means calculates the average value and the reference value using the latest timer values.

7. A receiver according to claim 1, wherein said first and second storage means constitute a one-chip CPU together with said control means, and said third storage means comprises a read only memory.

8. A receiver according to claim 1, wherein said first to third storage means retain storage contents while a power switch is kept off, and an average value stored in said second storage means immediately after a power ON operation is calculated on the basis of the timer values stored in said first storage means before the power switch is turned off and after the power switch is turned on.

* * * * *